United States Patent [19]
Post

[11] Patent Number: 5,847,480
[45] Date of Patent: Dec. 8, 1998

[54] PASSIVE MAGNETIC BEARING ELEMENT WITH MINIMAL POWER LOSSES

[75] Inventor: Richard F. Post, Walnut Creek, Calif.

[73] Assignee: The Regents of the University of California, Oakland, Calif.

[21] Appl. No.: 552,446

[22] Filed: Nov. 3, 1995

[51] Int. Cl.$^6$ .................................................. H02K 7/09
[52] U.S. Cl. ...................... 310/90.5; 310/68 R; 310/103; 310/156
[58] Field of Search ................................ 310/90.5, 68 R, 310/156, 90, 90 J; 415/90

[56] References Cited

U.S. PATENT DOCUMENTS

| | | | |
|---|---|---|---|
| 5,117,448 | 5/1992 | Penato et al. ............................. | 378/132 |
| 5,302,874 | 4/1994 | Pinkerton ................................. | 310/905 |
| 5,345,128 | 9/1994 | Pinkerton et al. ...................... | 310/90.5 |
| 5,451,825 | 9/1995 | Strohm .................................... | 310/178 |
| 5,495,221 | 2/1996 | Post ......................................... | 335/299 |
| 5,547,338 | 8/1996 | Conrad et al. ............................ | 415/90 |

*Primary Examiner*—Clayton E. LaBalle
*Assistant Examiner*—Elvin G. Enad
*Attorney, Agent, or Firm*—Henry P. Sartorio; John P. Wooldridge

[57] ABSTRACT

Systems employing passive magnetic bearing elements having minimal power losses are provided. Improved stabilizing elements are shown, employing periodic magnet arrays and inductively loaded circuits, but with improved characteristics compared to the elements disclosed in U.S. Patent No. 5,495,221 entitled "Dynamically Stable Magnetic Suspension/Bearing System." The improvements relate to increasing the magnitude of the force derivative, while at the same time reducing the power dissipated during the normal operation of the bearing system, to provide a passive bearing system that has virtually no losses under equilibrium conditions, that is, when the supported system is not subject to any accelerations except those of gravity.

22 Claims, 4 Drawing Sheets

PASSIVE MAGNETIC BEARING ELEMENT WITH MINIMAL POWER LOSSES

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to magnetic bearing system components, and more specifically, it relates to an improved stabilizing element employing spatially periodic magnet arrays and inductive circuits having reduced power losses during the operation of a magnetic bearing system.

2. Description of Related Art

Motor and generator armatures, flywheel rotors, and other rotatable components have conventionally been supported and constrained against radially and axially directed forces by mechanical bearings, such as journal bearings, ball bearings, and roller bearings. Such bearings necessarily involve mechanical contact between the rotating element and the bearing components, leading to problems of friction and wear that are well known. Even non-contacting bearings, such as air bearings, involve frictional losses that can be appreciable, and are sensitive to the presence of dust particles. In addition, mechanical bearings, and especially air bearings, are poorly adapted for use in a vacuum environment.

The use of magnetic forces to provide a non-contacting, low friction equivalent of the mechanical bearing is a concept that provides an attractive alternative, one which is now being exploited commercially for a variety of applications. All presently available commercial magnetic bearing/suspension elements are subject to limitations, arising from a fundamental physics issue, that increase their cost and complexity. These limitations make the conventional magnetic bearing elements unsuitable for a wide variety of uses where complexity-related issues, the issue of power requirements, and the requirement for high reliability are paramount.

The physics issue referred to is known by the name of Earnshaw's Theorem. According to Earnshaw's Theorem (when it is applied to magnetic systems), any magnetic suspension element, such as a magnetic bearing that utilizes static magnetic forces between a stationary and a rotating component, cannot exist stably in a state of equilibrium against external forces, e.g. gravity. In other words if such a bearing element is designed to be stable against radially directed displacements, it will be unstable against axially directed displacements, and vice versa. The assumptions implicit in the derivation of Earnshaw's Theorem are that the magnetic fields are static in nature (i.e. that they arise from either fixed currents or objects of fixed magnetization) and that diamagnetic bodies are excluded.

The almost universal response to the restriction imposed by Earnshaw's Theorem has been the following: Magnetic bearing elements are designed to be stable along at least one axis, for example, their axis of symmetry, and then external stabilizing means are used to insure stability along the remaining axes. The "means" referred to could either be mechanical, i.e. ball bearings or the like, or, more commonly, electromagnetic. In the latter approach magnet coils are employed to provide stabilizing forces through electronic servo amplifiers and position sensors that detect the incipiently unstable motion of the rotating element and restore it to its (otherwise unstable) position of force equilibrium.

Less common than the servo-controlled magnetic bearings just described are magnetic bearings that use superconductors to provide a repelling force acting against a permanent magnet element in such a way as to stably levitate that magnet. These bearing types utilize the flux-excluding property of superconductors to attain a stable state, achieved by properly shaping the superconductor and the magnet so as to provide restoring forces for displacements in any direction from the position of force equilibrium. Needless to say, magnetic bearings that employ superconductors are subject to the limitations imposed by the need to maintain the superconductor at cryogenic temperatures, as well as limitations on the magnitude of the forces that they can exert, as determined by the characteristics of the superconductor employed to provide that force.

The magnetic bearing approaches that have been described represent the presently utilized means for creating a stable situation in the face of the limitations imposed by Earnshaw's Theorem. The approach followed by the first one of these (i.e., the one not using superconducting materials) is to overcome these limitations by introducing other force-producing elements, either mechanical, or electromagnetic in nature, that restore equilibrium. The latter, the servo-controlled magnetic bearing, is usually designated as an "active" magnetic bearing, referring to the active involvement of electronic feedback circuitry in maintaining stability.

SUMMARY OF THE INVENTION

It is an object of the present invention to provide passive magnetic bearing elements having minimal power losses.

It is another object of the present invention to provide a magnetic bearing cartridge employing passive magnetic bearing elements having minimal power losses.

One embodiment of the invention is an improved stabilizing element, employing periodic magnet arrays and inductively loaded circuits, but with improved characteristics compared to the elements disclosed in U.S. Pat. application Ser. No. 08/207,622 entitled "Dynamically Stable Magnetic Suspension/Bearing System." The improvements relate to increasing the magnitude of the force derivative, while at the same time reducing the power dissipated during the normal operation of the bearing system, to provide passive bearing systems that have virtually no losses under equilibrium conditions, that is, when the supported system is not subject to any accelerations except those of gravity.

Another embodiment of the invention is a new type of magnetic bearing cartridge that combines strong radially restoring forces with axial stability, without incurring appreciable power losses under equilibrium conditions. Insensitivity to temperature or time-induced strengths of the permanent magnet elements in the cartridge (or in associated axial-force bearing elements) is accomplished by geometry (centering the position of equilibrium between two opposing-force bearing elements). In this way temperature variations in the permanent magnet elements (if the same in both elements) does not displace the equilibrium position, thus does not call on the spatially periodic magnetic array-inductive circuit element to provide a net axial force.

DETAILED DESCRIPTION OF THE INVENTION

In the design of passive magnetic bearings in accordance with the teachings of applicant's allowed U.S. Pat. application Ser. No. 08/207,622 entitled "Dynamically Stable Magnetic Suspension/Bearing System," which is incorporated herein by reference, it is necessary to use a combination of passive elements with compensating force derivatives in order to achieve stable levitation. One such element, described in the aforesaid patent application, employs a combination of a spatially periodic magnetic field, such as is produced by a spatially periodic magnetic array (e.g., a Halbach array), in combination with inductive circuit elements, to produce the desired stabilizing force derivatives that overcome the destabilizing force derivatives from other elements. These "other elements" can be, for example, axially symmetric permanent magnet rings, operating either in an attractive or a repelling mode with respect to their axially directed force. The present invention relates to an improved stabilizing element, also employing spatially periodic magnet arrays and inductive circuits, but with improved characteristics compared to the elements in the above described patent application. The improvements relate to increasing the magnitude of the force derivative, while at the same time reducing the power dissipated during the normal operation of the bearing system to provide a passive bearing system that has virtually no losses under equilibrium conditions, that is, when the supported system is not subject to any accelerations except those of gravity.

Figure 1A:
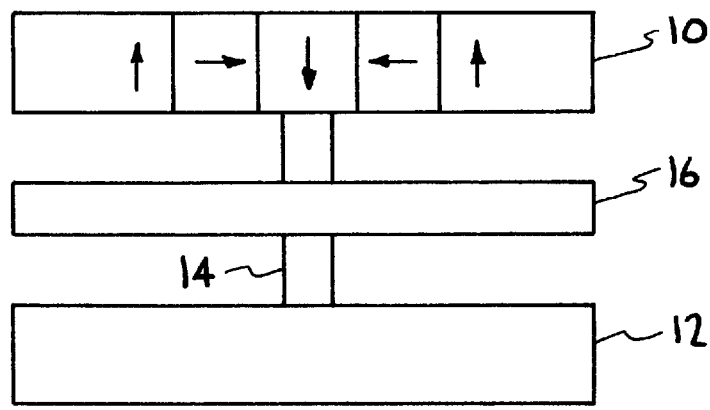
FIG. 1A is a side view of a passive bearing element with minimal power losses.
Figure 1B:
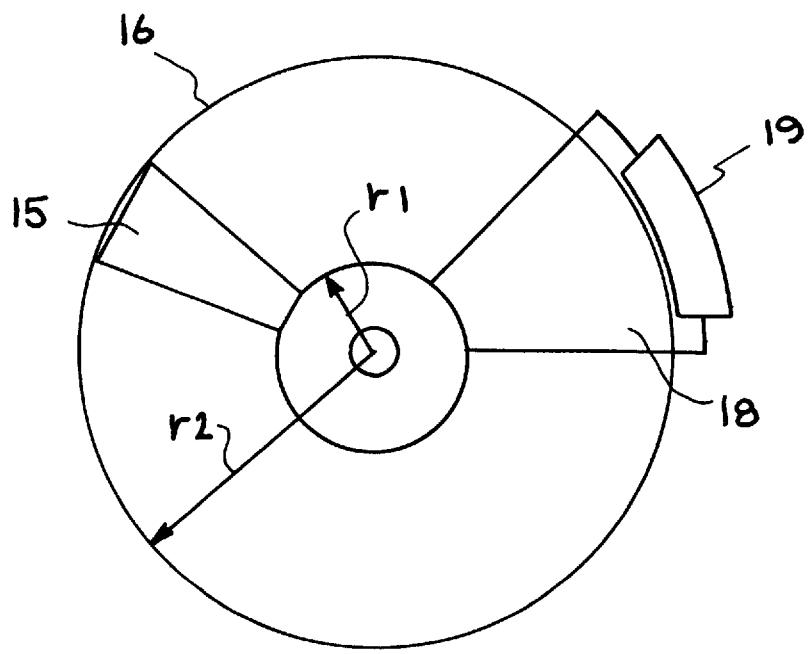
FIG. 1B is a top view of the planar conductor array of FIG. 1A.

The components of one embodiment of the new system are shown schematically in FIG. 1A, which depicts the bearing element with its axis in the vertical direction. (It may also be advantageous to use it with horizontal-axis systems, as will be mentioned later). The spatially periodic magnetic arrays (e.g., Halbach arrays) 10 and 12 are attached by shaft 14 and lie above and below the planar array of inductive circuits (e.g., inductively loaded circuits) 16. In general, array 10 is fixed to and spaced apart from array 12. FIG. 1B shows a top view of the planar conductor array 16 of FIG. 1A and a representative magnet segment 15. Planar conductor array is movably located between arrays 10 and 12. Array 16 consists of an inductive circuit having a circuit conductor 18 with inductive loading 19. Typically these magnetic arrays would be coupled together and would be the rotating elements, while the circuit array between them would be stationary. It is also necessary that the azimuthal orientation of the magnet arrays be such that the azimuthal components of their fields add at a fixed position at about the midplane or midway between them, while their axial components cancel on the midplane. Thus the axial flux through the planar circuits is nulled out when their symmetry plane corresponds to the midplane between the magnets, becoming finite only when the magnet array is displaced vertically with respect to the planar circuit. If then the other permanent magnet elements that are attached to the rotating system are arranged so as to reach force equilibrium with external forces (i.e. gravity) at an axial position corresponding to the location where the rotating spatially periodic magnet arrays lie symmetrically above and below the planar circuit, the induced currents and thus the resistive power dissipation in those circuits will approach zero. For a horizontal-axis system this circumstance can be accomplished purely geometrically. For a vertical-axis system it can be accomplished by a combination of geometrical location and tailoring the magnetic fields and/or gap of the permanent magnet elements so as to accomplish this objective.

An approximate analysis of the concept yields a theoretical estimate of the magnitude of the force derivative as a function of circuit and field-parameters. The following derived expression is useful to design a system having a desired force derivative:

$$\left[ \frac{d<F>}{dx} \right]_{x=0} \approx \frac{8r_2^2 B_0^2 m}{L_0} \left[ 1 - \frac{r_1}{r_2} \right]^2 \exp(-2ka) \text{ N } m^{-1}$$

Here $B_0$ is the peak strength of the field at the inner surface of each Halbach array, $L_0$ is the inductance per circuit, m is the number of circuits in the planar array, and k is $2\pi_s/\lambda$ with $\lambda$, being the mean azimuthal wavelength of the Halbach arrays, which are separated by distance $2a$, with $r_1$ and $r_2$ being the inner and outer radius of the ends of the Halbach array magnet bars.

Note that the force derivative depends on azimuthal wavelength only through the term $\exp(-2ka)$, leaving the choice of wavelength open for optimization. Whatever choice is made, however, the azimuthal spacing of the legs of each of the circuits must be chosen to match it. Note also that in-phase elements of the circuits, i.e., those elements that are spaced one-half wavelength azimuthally from each other, may be connected in series, using a lumped inductance load, where this is appropriate, that is equal to the sum of the inductance needed for each circuit if alone. Under some circumstances, the self and mutual inductances of the circuits themselves are sufficient, so that no extra inductance loading elements are required.

As an example of the level of force derivative that is possible from even a small element, consider the following set of parameters:

$B_0=1.0$ Tesla; $L_0=10^{-6}$ hy/circuit; m=40; $r_2=0.05$ m.; $r_1/r_2=1/3$

Finding:

$$\left[ \frac{d<F>}{dx} \right]_{x=0} 3.56 \times$$

$10^5$ N $m^{-1}$ exp($-2ka$) (2030 lbs/inch)exp($-2ka$)

Another embodiment pertains to an improved magnetic bearing element in the form of a radially and axially stable bearing "cartridge" employing, for radial stability, two radially stable, axially unstable permanent-magnet-excited bearing elements whose axial forces oppose and balance each other out, thus establishing a metastable equilibrium for axial displacements. Axial stability is provided by means described below.

Figure 2A:
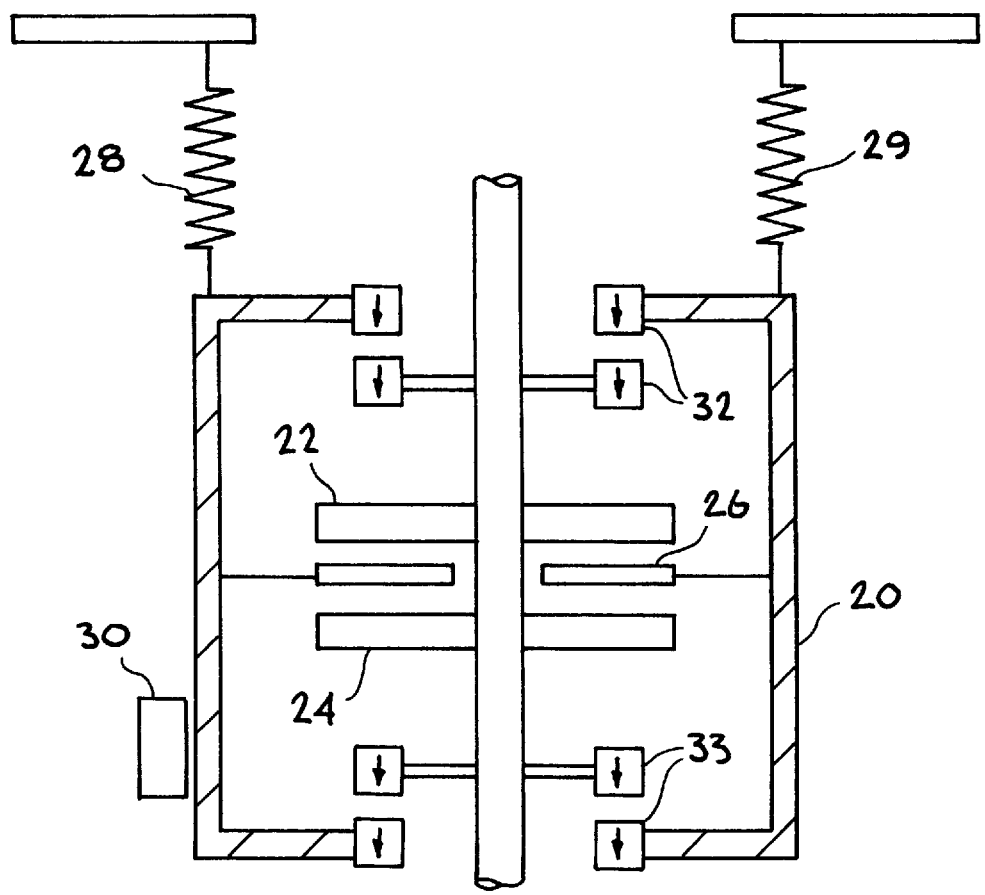
FIG. 2A is a side view of a first embodiment of a magnetic bearing cartridge.
Figure 2B:
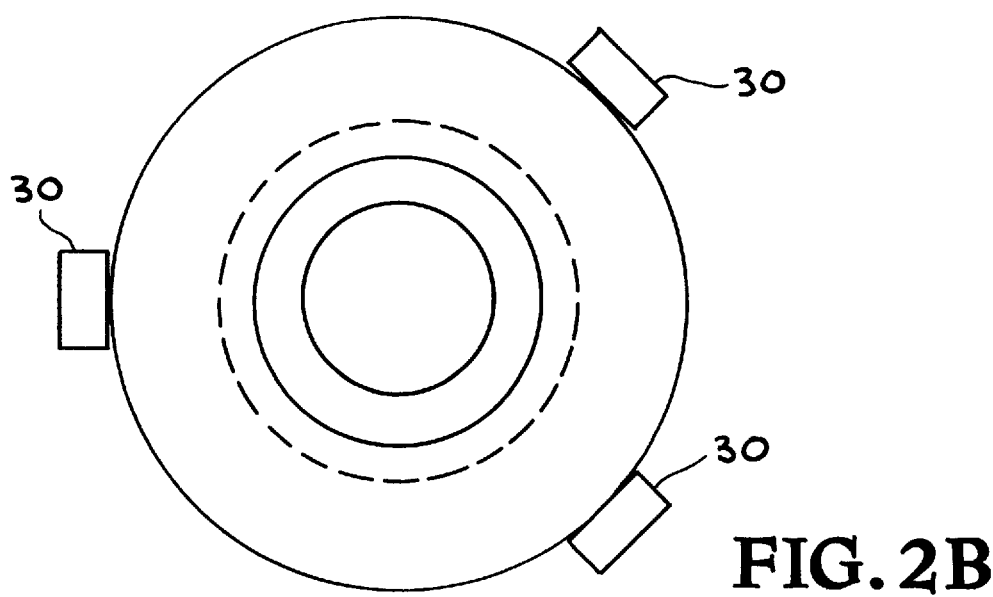
FIG. 2B is a top view of the cartridge and centering elements of FIG. 2A.
Figure 3A:
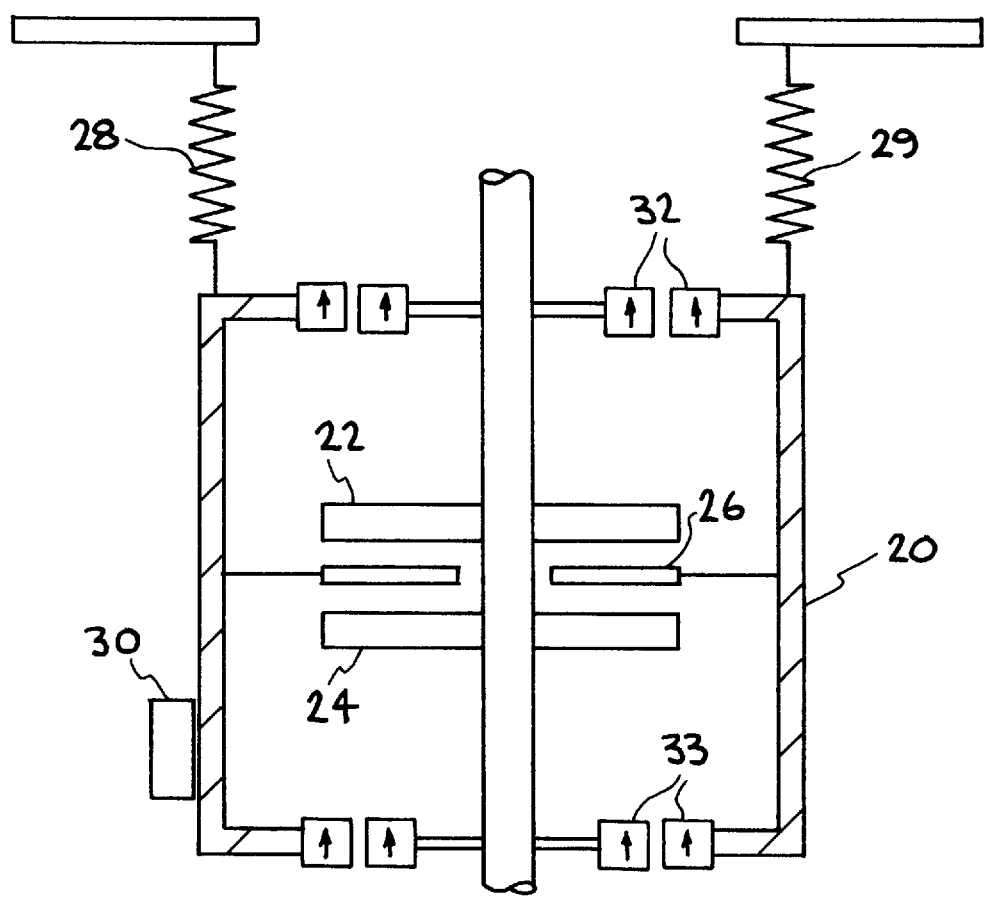
FIG. 3A is a side view of a second embodiment of a magnetic bearing cartridge.
Figure 3B:
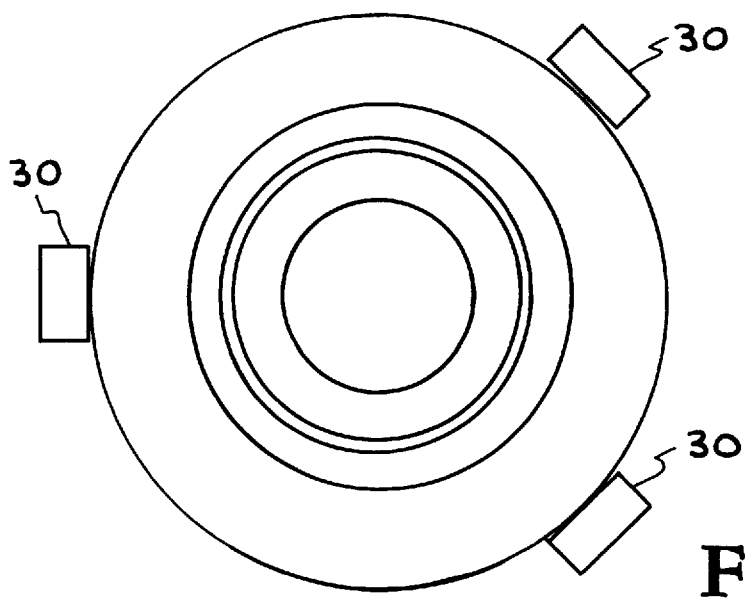
FIG. 3B is a top view of the cartridge and centering elements of FIG. 3A.

FIGS. 2A and 3A indicate equivalent elements with identical numbers. The figures show a cartridge-type element 20 which can provide strong radially centering forces, while remaining axially stable (above a critical operating speed) with minimal power losses as long as the cartridge 20 is not called on to provide a substantial net axial force. This latter requirement would be automatically fulfilled were two such cartridges used to support the two ends of a horizontal rotating shaft (such as the two ends of the shaft of an electric motor). For a vertically oriented system, axially stable vertical levitation could be provided by one or more opposing bearing elements whose radially unstable force derivatives are by design chosen to be smaller than the radial stabilizing force derivatives provided by the cartridge (or cartridges, if two are used). In this latter case, as shown in FIG. 2A, to insure that the centering element (i.e., spatially periodic magnetic arrays such as Halbach arrays 22 and 24 and associated inductive circuit array 26) does not experience any appreciable axial load, the cartridge is supported vertically by low compliance springs 28 and 29. These are adjusted so as to support the weight of the cartridge when it is centered vertically with respect to its rotating elements, i.e. when the inductive circuit array 26 is midway between the two Halbach Arrays 22, 24. If now small deviations from this position occur during operation (for example, as a result of temperature variations that affect the levitating power of the repelling bearing elements) the low compliance springs 28, 29 will adjust to the new position with a minimal axial force, thus with minimal increase in the power dissipation by the inductive circuit array. To insure that the required radial centering force is provided by the bearing cartridge, it is restrained radially by sliding-fit retainers 30 (or a slip-fit cylinder, or the equivalent) as shown in FIGS. 2B and 3C.

A key point to recognize is that by the use of opposed radially stable permanent magnet elements 32 and 33 operated at their point of metastable equilibrium (i.e., when centered geometrically), the axial stabilizing element is only called on to provide an axially centering force derivative that exceeds the axially destabilizing force derivative from the radially stable bearing pair. At the exact metastable equilibrium point no axial force is required to accomplish this result, thus the resistive power dissipated in the stabilizer will be "zero". For small deviations from equilibrium the resistive power dissipation will be non-zero but correspondingly small. This situation is to be contrasted with one where a single Halbach array and inductive circuit is used to provide axial stability against the axially destabilizing force derivative of a radially stable magnetic bearing element. In this case the stabilizer must provide a continuous force in opposition to the bearing element, thus will dissipate power continually.

In applications, such as vehicular ones, where short-duration vertical accelerations might occur, the low-compliance supporting springs might be augmented by "shock-absorber-type" elements 28, 29. These would transmit short duration vertical accelerations to the cartridge, while producing no net vertical force at equilibrium. In this way the strong axial force derivative associated with the Halbach arrays in interaction with the inductive circuit elements could absorb impulsive axial forces with only a momentarily increased power loss.

Figure 4:
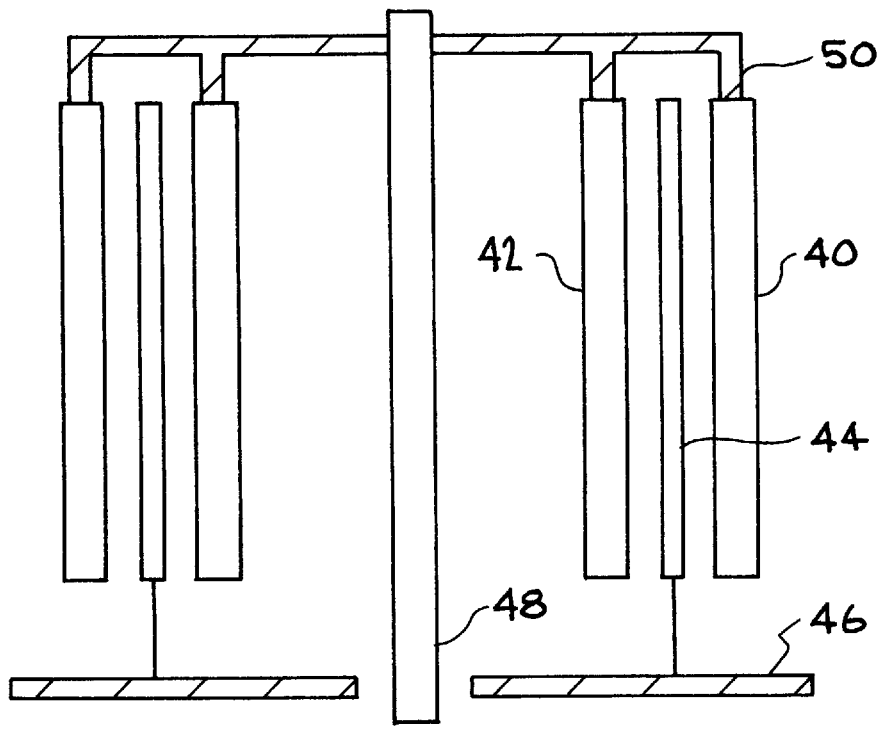
FIG. 4 shows a side view of an embodiment of the invention using cylindrical spatially periodic magnetic arrays and a cylindrical inductive circuit array.

Note also that, although the in above embodiments, strong axial force derivatives are produced, the concept can also be applied to create strong radial force derivatives, again with vanishing induced currents and resistive power losses at the equilibrium position. As shown in FIG. 4, all that is required is that the spatially periodic magnetic arrays be made in the form of concentric cylinder magnetic arrays 40 and 42, with the inner face of the outer cylinder 40 carrying one array, and the outer face of the inner cylinder 42 carrying the other array. The inductive circuits then lie on a cylinder 44 at a radius corresponding to the null point for the radial magnetic field that exists between the two arrays 40, 42. The concentric cylinder magnetic arrays 40 and 42 are connected to a shaft 48 by a support 50. The cylindrical inductive circuit array 44 is supported by a support structure 46. As in the other embodiments, either the magnet arrays can be rotating, with the windings stationary, or vice-versa.

Figure 5:
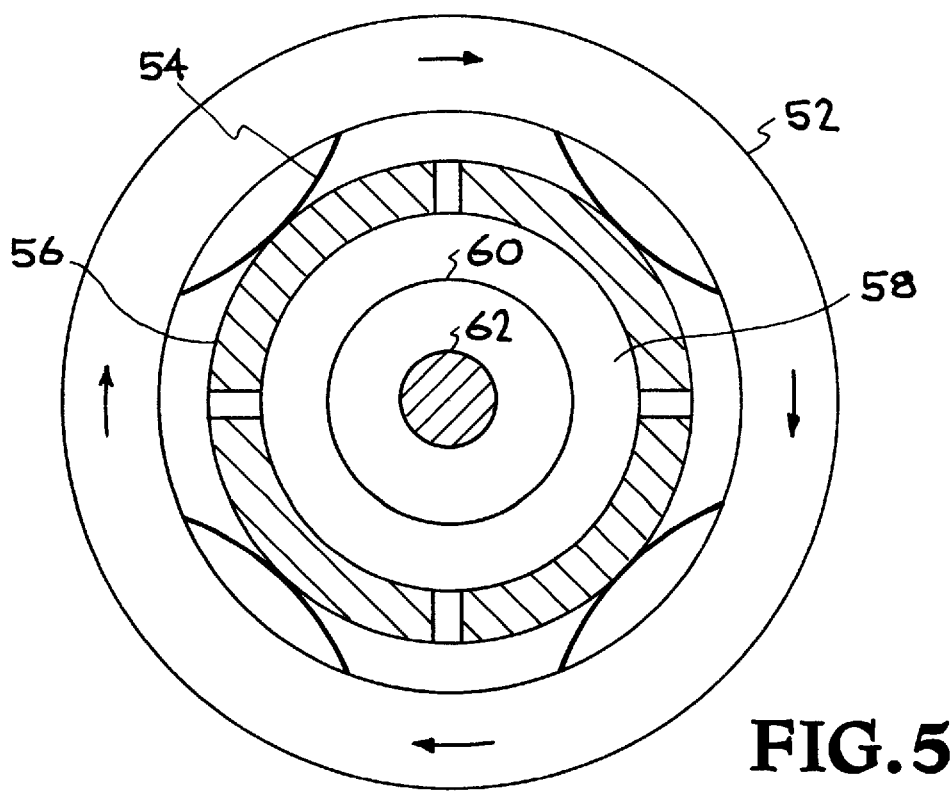
FIG. 5 shows a centrifugally disengaging mechanical bearing.

Thus, for the bearing systems described in the invention to operate successfully, mechanical or other means must be provided to maintain stability when the rotating element is at rest, or when rotating below a low critical speed determined by the design. To accomplish this end various elements can be used, whereby centering elements act below a critical speed, and are thereafter disengaged, for example by centrifugal action. A centrifugally disengaging mechanical bearing is shown schematically in FIG. 5. It is comprises an outer (rotating) element 52, spring elements 54, and retainer quadrants 56. Retainers 56 remain in contact with the outer race 58 of a ball bearing, the inner race 60 of which is non-rotating and which is held in position by shaft 62, which is similar to the shafts 14 in FIG. 1A and shaft 48 in FIG. 4. As shown, a ball bearing acts on the rotating element at zero or slow speeds, and then is disengaged by the action of the spring-like elements 54 that expand under the influence of centrifugal forces. Other means for achieving this end will be apparent to those skilled in the art. As a part of the present invention, it should be recognized that disengaging mechanical elements of the type described can have a dual function. They not only can function to maintain stability while the rotating element is spun up from zero speed, but if properly designed, they can act as "backup" bearings to accommodate momentary accelerations such as from seismic effects (in stationary systems) or road shocks in mobile systems.

Changes and modifications in the specifically described embodiments can be carried out without departing from the scope of the invention, which is intended to be limited by the scope of the appended claims.

I claim:

1. An apparatus, comprising:

a first spatially periodic permanent magnetic array comprising a first Halbach array;

a second spatially periodic permanent magnetic array comprising a second Halbach array, wherein said second spatially periodic permanent magnetic array is fixedly connected to said first spatially periodic permanent magnetic array and spaced apart from said first spatially periodic permanent magnetic array, wherein said first Halbach array and said second Halbach array are geometrically identical such that they have the same number of magnets and the same pole number so that their fields have the same azimuthal spatial periodicity;

a conductor array movably located between said first Halbach array and said second Halbach array, wherein said conductor array comprises a plurality of inductive circuits;

wherein azimuthal magnetic components of said first Halbach array and azimuthal magnetic components of said second Halbach array add at an equilibrium position between them, wherein said first Halbach array and said second Halbach array together are selected from a group consisting of two concentric cylinders and two planar arrays, wherein said two concentric cylinders are oriented azimuthally with respect to each other such that their radial magnetic components cancel at said equilibrium position, wherein said two planar arrays are oriented azimuthally with respect to each other such they are facing each other and that their axial components cancel at said equilibrium position; and means for sustaining said at least one rotatable element in stable equilibrium until said rotatable element has exceeded a critical angular velocity, wherein at said equilibrium position between said first Halbach array and said second Halbach array, said conductor array intercepts near zero flux, wherein the resistive power losses in said conductor array are reduced to near zero.

2. The apparatus of claim 1, wherein said first spatially periodic magnetic array and said second spatially periodic magnetic array are both selected from the same group consisting of a planar magnetic array and a cylindrical magnetic array.

3. The apparatus of claim 2, wherein the axial magnetic components of said first spatially periodic magnetic array of said planar magnetic array and the axial magnetic components of said second spatially periodic magnetic array of said planar magnetic array cancel at said equilibrium position; and wherein the radial magnetic components of said first spatially periodic magnetic array of said cylindrical magnetic array and the radial magnetic components of said second spatially periodic magnetic array of said cylindrical magnetic array cancel at a region between them.

4. The apparatus of claim 3, wherein said conductor array is selected from a group consisting of a planar conductor array and a cylindrical conductor array.

5. The apparatus of claim 1, wherein said first Halbach array together with said second Halbach array are rotatable with respect to said conductor array which is stationary.

6. The apparatus of claim 1, wherein said first Halbach array together with said second Halbach array are stationary with respect to said conductor array which is rotatable.

7. An apparatus, comprising:

aa first spatially periodic permanent magnetic array comprising a first Halbach array;

a second spatially periodic permanent magnetic array comprising a second Halbach array, wherein said second spatially periodic permanent magnetic array is fixedly connected to said first spatially periodic permanent magnetic array and spaced apart from said first spatially periodic permanent magnetic array, wherein said first Halbach array and said second Halbach array are geometrically identical such that they have the same number of magnets and the same pole number so that their fields have the same azimuthal spatial periodicity;

wherein said first spatially periodic magnetic array and said second spatially periodic magnetic array are both selected from the same group consisting of a planar magnetic array and a cylindrical magnetic array;

a planar conductor array movably located between said first spatially periodic magnetic array of said planar magnetic array and said second spatially periodic magnetic array of said planar magnetic array, wherein said planar conductor array comprises a plurality of inductive circuits;

a cylindrical conductor array movably located between said first spatially periodic magnetic array of said cylindrical magnetic array and said second spatially periodic magnetic array of said cylindrical magnetic array, wherein said cylindrical conductor array comprises a plurality of inductive circuits;

wherein azimuthal magnetic components of said first spatially periodic magnetic array of said planar magnetic array and azimuthal magnetic components of said second spatially periodic magnetic array of said planar magnetic array add at an equilibrium position between them, wherein axial magnetic components of said first spatially periodic magnetic array of said planar magnetic array and axial magnetic components of said second spatially periodic magnetic array of said planar magnetic array cancel an equilibrium position between them;

wherein azimuthal magnetic components of said first spatially periodic magnetic array of said cylindrical magnetic array and azimuthal magnetic components of said second spatially periodic magnetic array of said cylindrical magnetic array add between them, wherein radial magnetic components of said first spatially periodic magnetic array of said cylindrical magnetic array and radial magnetic components of said second spatially periodic magnetic array of said cylindrical magnetic array cancel at an equilibrium position between them;

at least one rotatable element selected from a first group consisting of said first spatially periodic magnetic array and said second spatially periodic magnetic array, and a second group consisting of said planar conductor array and said cylindrical conductor array; and means for sustaining said at least one rotatable element in stable equilibrium until said rotatable element has exceeded a critical angular velocity.

8. The apparatus of claim 7, wherein said plurality of inductive circuits comprise inductively loaded circuits.

9. The apparatus of claim 7, further comprising permanent magnet elements fixedly attached to said first spatially periodic magnetic array and said second spatially periodic magnetic array, wherein said permanent magnet elements are arranged so as to reach force equilibrium with external forces (i.e. gravity) at an axial position corresponding to the location where said first and second spatially periodic magnet array lie symmetrically above and below said planar conductor array.

10. The apparatus of claim 7, wherein each said spatially periodic magnetic array may be designed to produce a force derivative $$\left[ \frac{d<F>}{dx} \right]_{x=0}$$

determined by the formula $$\left[ \frac{d<F>}{dx} \right]_{x=0} \approx \frac{8r_2^2 B_0^2 m}{L_0} \left[ 1 - \frac{r_1}{r_2} \right]^2 \exp(-2ka) \text{ N } m^{-1}$$

where $B_0$ is the peak strength of the field at the inner surface of each spatially periodic magnetic array, $L_0$ is the inductance per said inductive circuit, m is the number of circuits in said planar conductor array, and k is $2\pi/\lambda$ where $\lambda$, is the mean azimuthal wavelength of said spatially periodic magnetic array, which are separated by distance $2a$, with $r_1$, and $r_2$ being the inner and outer radius of the ends of the magnet bars of said spatially periodic magnetic array.

11. The apparatus of claim 7, wherein said inductive circuits comprise in-phase elements that are connected in series.

12. The apparatus of claim 11, wherein said inductive circuits comprise a lumped inductance load.

13. The apparatus of claim 7, wherein said cylindrical magnetic array comprises an outer first concentric cylinder and an inner second concentric cylinder, wherein said first spatially periodic magnetic array is fixedly connected to the inner face of said outer first concentric cylinder, wherein said second spatially periodic magnetic array is fixedly connected to the outer face of said inner second concentric cylinder, wherein said cylindrical conductor array is located at a radius corresponding to the null point for the radial magnetic field that exists between said first spatially periodic magnetic array and said second spatially periodic magnetic array.

14. The apparatus of claim 7, further comprising a pair of radially stable permanent-magnet bearings comprising attracting inner and outer bearing elements, wherein said inner bearing elements are fixedly attached to said first spatially periodic magnetic array and said second spatially periodic magnetic array, and said outer bearing elements, together with said planar conducting array are fixedly attached to a bearing cartridge, wherein each bearing of said pair of radially stable permanent-magnet bearings is disposed on opposite sides of a unit defined by said first spatially periodic magnet array, said planar conductor array and said second spatially periodic magnet array.

15. The apparatus of claim 14, further comprising a plurality of low compliance supporting springs connected to said bearing cartridge and a support structure.

16. The apparatus of claim 14, further comprising a plurality of centering elements fixedly connected to said support structure and configured to provide a centering force on said bearing cartridge.

17. The apparatus of claim 14, wherein said plurality of circuits comprise inductive circuits.

18. The apparatus of claim 14, wherein said plurality of circuits comprise inductively loaded circuits.

19. The apparatus of claim 14, wherein each said spatially periodic magnetic array is rotatable and said planar conductor array is non-rotatable.

20. The apparatus of claim 14, wherein each said spatially periodic magnetic array is non-rotatable and said planar conductor array is rotatable.

21. The apparatus of claim 15, wherein said plurality of low compliance supporting springs are augmented by at least one shock absorber connected to said bearing cartridge and a support structure.

22. The apparatus of claim 16, wherein said plurality of centering elements is selected from a group consisting of a sliding-fit retainer and a slip-fit cylinder.

* * * * *